United States Patent
Knop

[11] Patent Number: 5,545,251
[45] Date of Patent: Aug. 13, 1996

[54] METHOD OF AND DEVICE FOR DIRECTLY REDUCING FINE-PARTICLE ORES AND CONCENTRATES THEREOF

[75] Inventor: Klaus Knop, Bottrop, Germany

[73] Assignee: MAN Gutehoffnungshütte Aktiengesellschaft, Oberhausen, Germany

[21] Appl. No.: 286,164

[22] Filed: Aug. 5, 1994

[30] Foreign Application Priority Data

Aug. 7, 1993 [DE] Germany .......................... 43 26 562.6

[51] Int. Cl.$^6$ .................................................. C21B 11/00
[52] U.S. Cl. ............................................ 75/444; 266/172
[58] Field of Search ................... 75/444, 445; 266/172

[56] References Cited

U.S. PATENT DOCUMENTS

| | | | |
|---|---|---|---|
| 4,978,387 | 12/1990 | Kepplinger | 75/445 |
| 5,082,251 | 6/1992 | Whipp | 266/172 |

*Primary Examiner*—Peter D. Rosenberg
*Attorney, Agent, or Firm*—Max Fogiel

[57] ABSTRACT

The present invention concerns a method of and a device for directly reducing fine-particle ore in a horizontal reactor with an ore-reducing gas and a heat vehicle, also a gas, in a fluidized bed.

The ore-reducing vessel itself comprises a horizontal fluidized-bed reactor (1). The ore (F) is blown into it from below. The heated ore-reducing gas (A) is blown into the reactor through oncoming-gas floors (2). The heat needed for the endothermic reaction is supplied to the reactor at different temperatures through heat exchangers (3) and transferred to the bed. Heat is supplied counter to the ore-reducing gas.

Fuel (B) in the form of gas is burned with air (C) to make the heat vehicle (D). The ore-reducing gas (A') is heated in downstream heat exchangers (5.1 to 5.3) before arriving in the three sections (1a, 1b, & 1c) of the reactor through the floors.

Sponge iron (6) is removed and throat gas (E) extracted from a sponge-collecting section (1d).

40 Claims, 3 Drawing Sheets

METHOD OF AND DEVICE FOR DIRECTLY REDUCING FINE-PARTICLE ORES AND CONCENTRATES THEREOF

The present invention concerns a method of directly reducing fine-particle ores and concentrates thereof in a horizontal reactor by means of an ore-reducing gas and a heat-vehicle gas in a fluidized bed. The invention further concerns a device for carrying out the method.

Many methods of directly chemically reducing iron ores haver recently been developed. There is a lot of fine-particle ores and concentrates thereof in the world, and these methods make it possible to process them directly, without, that is, agglomerating them first by sintering, pelletizing, etc. They render fine-particle ores cost-effective for making steel. Methods and devices that employ fine-particle ores also have advantages over those that employ only coarse ores. These include conventional blast furnaces for pig iron and shaft furnaces or upright retorts for sponge iron.

The direct reduction of fine-particle ores in a fluidized bed in an upright reactor or series of upright reactors is known. The reactors employ solid or gaseous carbon-containing reduction agents. Reduction occurs very rapidly when the particles measure less than 0.1 mm. Fluidized-bed reactors are capable of carrying out reactions between gases and solids of such size to considerable extents.

Concentrates ranging in size between 0.1 and 1.0 mm occur in large quantities in the processing of poorer iron ores, and a method of reducing them in a fluidized-bed reactor with gases high in carbon monoxide or hydrogen would be interesting both technologically and economically. There are, however, limitations to reduction in such reactors, especially upright reactors. At high gas speeds the upper threshold of their output is dictated by their Stokes' extraction rate and the lower threshold by the vessels' fluidization point. When reaction is rapid the ore-reducing gas enters equilibrium soon after contact and becomes inactive. How much gas per unit of time flows through the bed is accordingly of considerable importance.

Many methods of reducing fine-particle iron ores with hydrogen are known, although they are not yet practical at an industrial scale (Bogdandy-Engell, Die Reduktion der Eisenerze, Berlin, Springer, 1967, pp. 225–236). One is the H-iron and another the nu-iron method. The H-iron method involves lower temperatures, pure hydrogen, and high pressure, and the nu-iron method a moderate temperature, pure hydrogen, and medium pressure.

In the H-iron method the reactor has a stack of three fluidized beds, two for reduction and one for preliminary heating. The gas and the ore accordingly flow more or less in opposite directions. Reduction, however, is slow due to the low temperature, and very little hydrogen can be chemically utilized due to the inconvenient equilibrium point and poor equilibrium approximation. The clean gas leaving the rector (approximately 94% of the total) is accordingly recycled and the water of reduction must be removed every cycle in the compressed-water wash.

The nu-iron method differs essentially from the H-iron process in higher reaction temperatures (600°–760° C.) and lower pressures. More gas is utilized although at the cost of controlling the bed in that the ore's sintering point is further approached. Gas utilization is near equilibrium even when the bed is thin. There is a half-industrial scale plant in existence that can handle two metric tons a day. The unused hydrogen has been recycled once the water is washed out.

Other known methods are the HIB (high-iron briquette) and FIOR processes, which have been or are being employed in Venezuela. Both employ hydrogen as a reduction agent. The HIB method is an advanced version of the nu-iron.

In the HIB process fine-particle iron ore is reduced in a two-stage upright fluidized-bed reactor and the resulting sponge briquetted. Steam-and-methane reformers can be employed to generate the ore-reducing gas. Once the ore has been prepared it is dried in two stages and heated before being provided to the stacked reactors. The already hot ore is reduced first in the upper and then in the lower reactor, at approximately 700° C. each time.

A plant that can process 4000 metric tons a year and operates in accordance with the FIOR method was started up in Venezuela in 1976. The plant has four reactors—one to heat the ore followed by a series of three fluidized-bed reactors to carry out the direct reduction. The heated ore is pneumatically conveyed to the upright reduction reactors, where it is reduced in stages while flowing counter to the ore-reducing gas, hydrogen and carbon dioxide.

The ore-reducing gas travels first through the farthest downstream and lowermost reactor and then through the reactor in the middle and leaves the reduction column through the farthest upstream and uppermost reactor, after which it arrives at a quenching and cleaning section. The clean and cool gas is compressed, enriched with fresh hydrogen, and recirculated for further reduction.

Some of the reasons for the failure of this process are sticking, caking of the starting materials, poor gas utilization, and incomplete reduction. The resulting low productivity and unsatisfactory economics have prevented both the HIB and FIOR approaches from being further developed.

There have as yet been no real breakthroughs in reduction in fluidized beds because they can be kept stable when the starting materials are very fine-particle (0.1–1.0 mm) only by slowing down the oncoming gas. Furthermore, when the oncoming gas is too hot, the aforesaid sticking of the starting materials will occur during reduction. Because of these two thresholds, specifically rapidly flowing gas and low temperatures, processing densities (in terms of metric tons of iron per square meter) are not as high as those attained in blast furnaces or by direct reduction if shaft furnaces.

The point of departure for the method in accordance with the present invention of directly reducing fine-particle ores with hydrogen in a horizontal fluidized-bed reactor is the method and device described in European Patent 0 329 673. Although that publication actually addresses the gasification of fine particles of coal in a fluidized-bed reactor, some of the significant discoveries that occurred while the process was being developed can be adapted to direct reduction in accordance with the present invention, exploiting the horizontal reactor illustrated in FIG. 2 therein.

Fluidized-bed generators for making gas out of coal and steam subject to high pressure and to heat supplied from pipes in a stationary cylindrical retort are known from German 2 423 951 and 2 910 437.

The free suspension of sheaves of high-temperature heat exchangers in a horizontal container with a heat exchanger for extremely hot gases or vapors to flow through and comprising several units is known from European Patent 0 424 625.

European Patent 0 440 886, finally, describes a horizontal fluidized-bed reactor with an oncoming-flow floor next to a fluidizing-fluid intake at the center. The line communicates with a collector, and oncoming-flow pipes extend out of each side of the collector.

The objects of the present invention are a method and device for directly reducing fine-particle ores or concentrates thereof that will lack the drawbacks of the prior art hereintofore described while being more economical in terms of acquisition and operation. The method in accordance with the present invention will better utilize the reduction by reducing the starting materials in stages and the specific output in terms of metric tons of iron per square meter per hour will be higher than those attained with present methods.

These objects are attained as recited in the first method claim and in the first device claim. The subsidiary claims recite advantages embodiments of the method and of the device for carrying it out.

The present method of directly reducing fine-particle iron ores in a fluidized bed in a horizontal reactor with hydrogen as an ore-reducing gas is based on assumptions that will now be enumerated and described.

The heat needed for reduction with hydrogen is 141 kcal per kg of iron. The endothermic reaction is

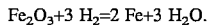

$$Fe_2O_3 + 3\,H_2 = 2\,Fe + 3\,H_2O.$$

Heat in addition to the heat of reaction is needed to heat the starting materials. The additional heat is 0.20 kcal/kg °C. and is supplied by a vehicle in the form of hot gas generated by burning fuel in the form of natural gas for example with compressed air.

The oncoming fluid that fluidizes the bed and reduces the ore is hydrogen at approximately 700° C. The result is a theoretically possible gas utilization of 30%, corresponding to approximately 2000 $Nm^3$ per metric ton of iron at an ideal ore reduction of 100%. The temperature of the ore-reducing gas will drop approximately 380° C. as it travels through the beds in the separate reactor sections.

The drop in temperature, however, decreases the actual gas utilization to approximately 20%, and more than 3000 $Nm^3$ per metric ton of iron will be needed.

The bed will be stable when the mean size of the particles of ore ranges from 0.1 to 1.0 mm and when the oncoming gas is hydrogen if the hydrogen flows at approximately 100 cm/sec. When the reduction agent is at approximately 700° C. and at atmospheric pressure, this equals 1010 $Nm^3/h \cdot m^2$ of flowing gas.

On this assumption the specific output will be 0.335 metric tons of iron per square meter at an efficiency of 20%. These figures been approximated in pilot plants for the direct reduction of iron ores.

There are two ways to increase specific output in direct reduction with hydrogen. The first is to increase pressure and the second to raise the mean fluidized-bed temperature in the reactor.

It is relatively easy to increase the temperature of the bed. The effect of pressure on specific output will be proportional, meaning that the output will be ten times as high at 10 bars and twenty times as high at 20 bars if enough gas is available.

At the aforesaid specific output of 0.335 tons of iron per square meter an hour the level will be 3.35 $t/m^2 \cdot h$ at 10 bars and 6.70 $t/m^2 \cdot h$ at 20 bars. These results are within the range of conventional direct-reduction plants and blast furnaces.

Raising the temperature of the oncoming ore-reducing gas is not recommended because temperatures above the ore's sticking point will entail the aforesaid risk of sticking even if the mean temperature of the bed is lower.

Indirect transfer of heat to the bed will increase the mean temperature inside the reactor. The heat is introduced into the bed from outside with a heat exchanger that is inserted like an immersion heater.

Gas utilization will accordingly increase from less than 20% to approximately 40% at approximately 750° C. The specific volume of ore-reducing gas will be 1584 $Nm^3$ per metric ton of iron. Output can be further increased by supplying more heat to the bed.

The process in accordance with the present invention, wherein the temperatures of the individual sections can be controlled, will prevent the fine-particle ore from sticking.

Another advantage of the method in accordance with the present invention is that the fine-particle ore or concentrates thereof in the bed travels through the separate reactor sections without mixing with preliminarily reduced or reduced particles.

The method in accordance with the present invention and the device for carrying it out are distinguished by a series of measures that ensure complete and economical reduction of fine-particle ores in the bed. These features will now be enumerated.

The fluidized-bed reactor is an in-itself known reactor in three sections.

Additional heat is supplied separately to each section.

The amount of heat supplied by the heat exchanger can be varied in accordance with temperature.

The additional heat needed for the endothermic reaction is not supplied through the reduction agent.

Fresh reduction agent is added at an appropriate temperature to each section.

The fine-particle ore can be heated and preliminarily reduced isothermally at high temperatures.

Reduction of up to 80% can be attained isothermally at lower temperatures than by heating and preliminary reduction.

Final reduction of up to 100% can be attained at low temperatures in terms of the ore's tendency to stick.

The ore can be reduced at all three section at high pressures.

The throat gas can be coarse-and-fine filtered, extracted from the water of reaction, and reused dry to reduce more ore, with the precipitating fine-particle ore also being recirculated.

The higher pressures allow such peripherals as water lines, gas filters, compressors, coolers, heat exchangers, pipelines, electric components, etc. to be smaller and lighter in weight.

One embodiment of a reactor in accordance with the present invention will now be specified with reference to the accompanying drawing. A reactor of this size and design is theoretically capable of handling 480 metric tons of iron an hour at a specific output of 6 metric tons per square meter an hour.

BRIEF DESCRIPTION OF DRAWINGS

FIG. 1 illustrates a direct-reduction plant. The reduction vessel itself comprises a horizontal fluidized-bed reactor 1. Fine-particle ore or ore concentrate F is blown into reactor 1 from below. The reduction agent is either hydrogen A or a mixture A' of appropriated gases. Heated mixture A' is forced into reactor sections 1a, 1b, and 1c through oncoming-gas floors 2. The heat needed for the reaction is supplied to the bed at different temperatures by heat exchangers 3 immersed in reactor sections 1a, 1b, and 1c. The heat is supplied in a current countering the flow of the reduction agent.

Figure 1:
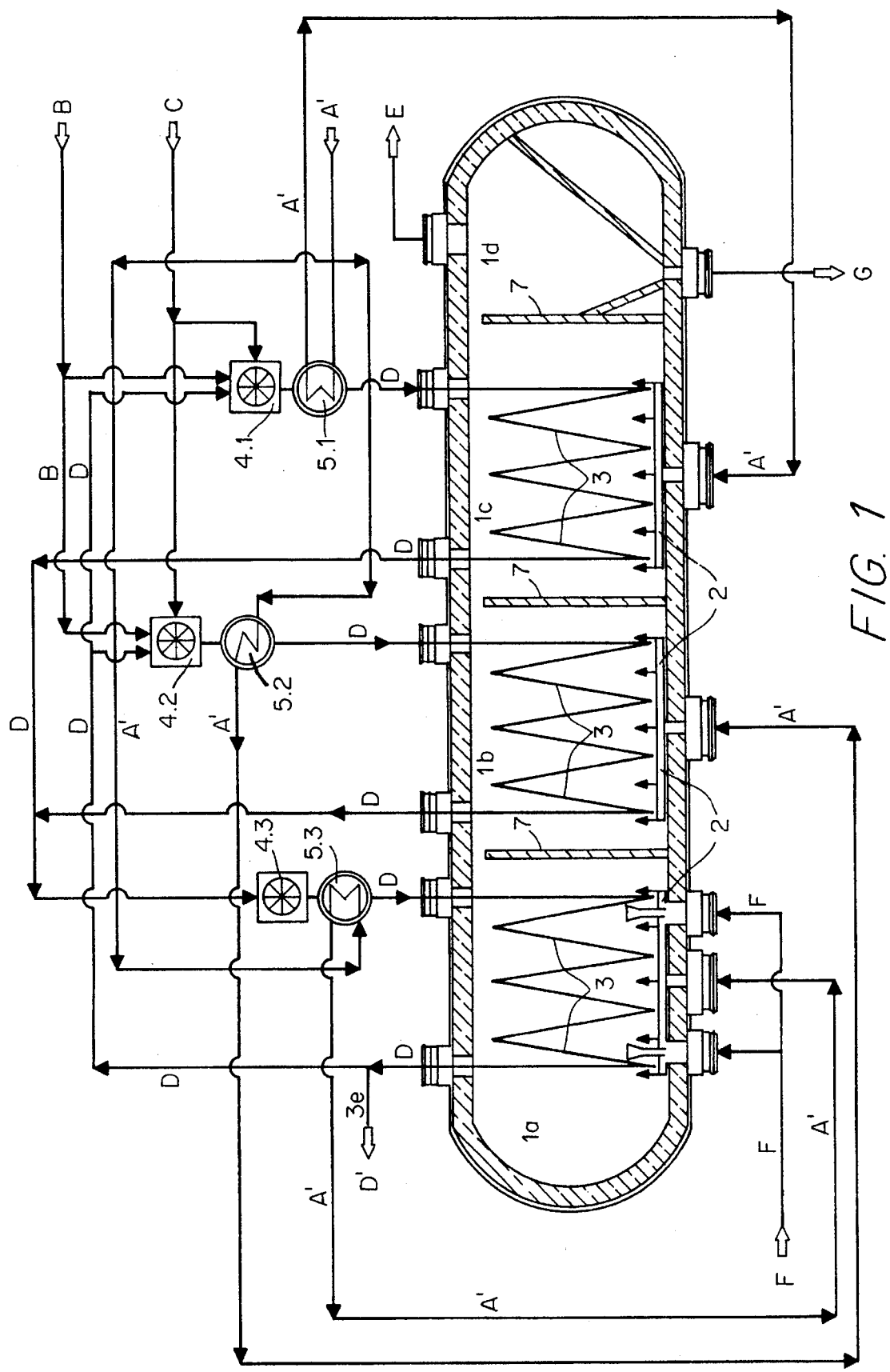
FIG. 1 is a longitudinal section through a horizontal reactor with external combustion chambers and heat exchangers.

Fuel gas B is burned along with air C in combustion chambers 4.1 and 4.2, creating a heat-vehicle gas D. Mixture A' of ore-reducing gases is heated in heat exchangers 5.1 to 5.3 downstream of combustion chambers 4.1 and 4.2 before being supplied to the reactor's separate sections 1a, 1b, and 1c through oncoming-gas floors 2.

Heat vehicle D enters the heat exchangers 3 in reactor sections 1c and 1b and, in the present embodiment, is heated further in another combustion chamber 4.3 with a downstream heat exchanger 5.3, into the heat exchanger 3 in reactor section 1a. Vehicle D either leaves the reactor by way of a line D that extends toward combustion chambers 4.1 and 4.2 or is diverted for further use in the process as a flue gas D' through a line 3e.

The pneumatically introduced fine-particle ore flows continuously through the individual sections 1a, 1b, and 1c of fluidized-bed reactor 1 while the reduction agent, hydrogen, removes oxygen from it. The resulting $H_2/H_2O$—$CO/CO_2$ leaves the reactor as what is called throat gas E through a special line. Throat gas E is supplied to hot-gas cyclones that the dust is precipitated in.

After traveling through reactor sections 1a, 1b, and 1c, the completely reduced ore or ore concentrate F is extracted in the form of sponge G.

Figure 2:
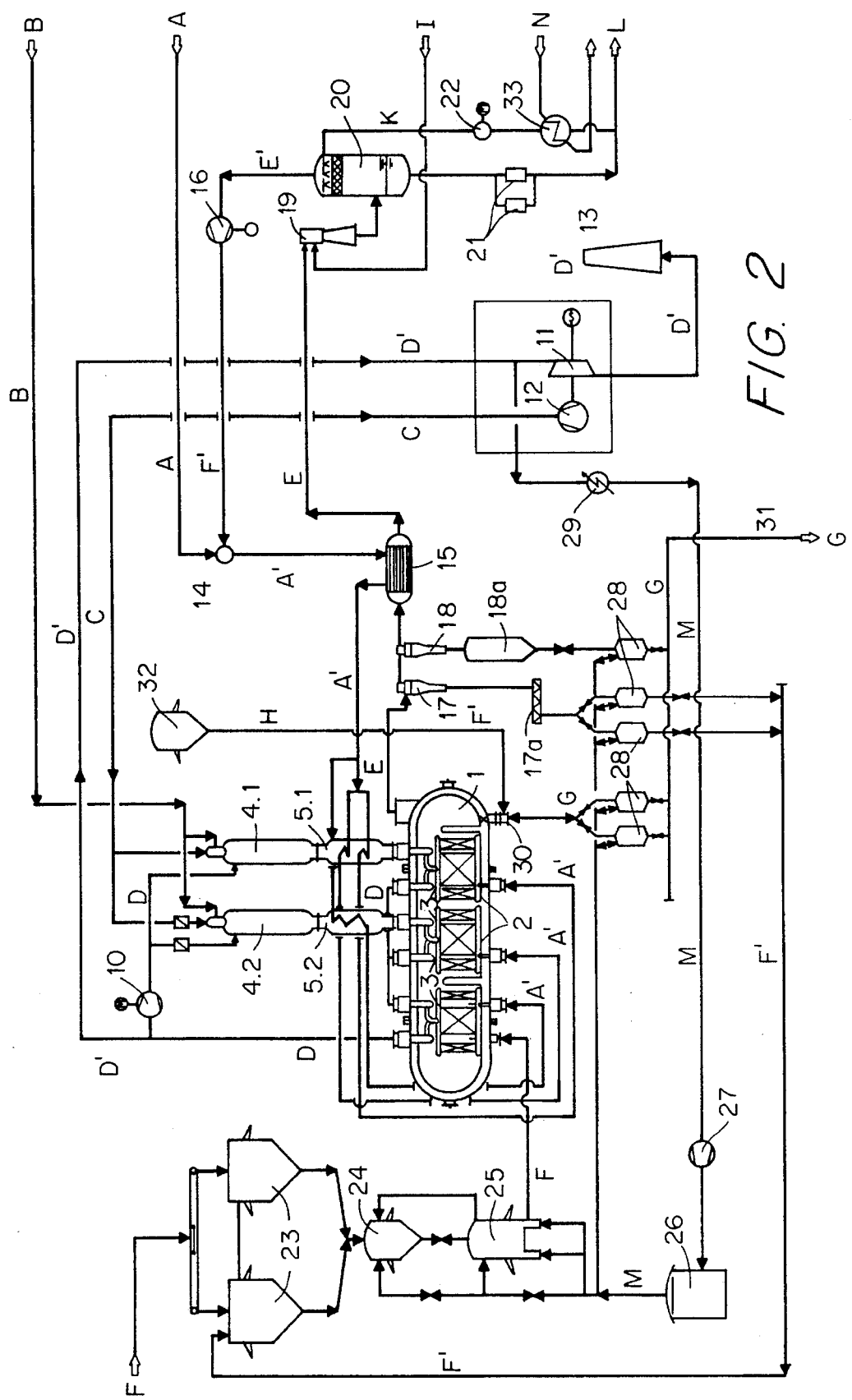
FIG. 2 is a flow chart of the method in accordance with the present invention, which employs hydrogen for direct reduction.

The flow chart in FIG. 2 illustrates how fluidized-bed reactor 1 operates.

The method in accordance with the present invention involves three gas-circulation systems, specifically a heat-vehicle system B, C, and D, a reduction-agent system A & A' and E & E', and a material system F and G, along with a number of auxiliary systems.

Heat-vehicle system B, C, and D will now be specified. Fuel B, natural gas for example, is burned with compressed air C in combustion chambers 4.1 and 4.2, producing a heat vehicle D, essentially nitrogen and carbon dioxide. Vehicle D accordingly enters the reactor's heat exchangers 3 at 550° to 800° C. The vehicle travels through downstream heat exchangers 5.1 and 5.2 and enters the heat exchangers 3 in reactor sections 1c and 1b. It leaves reactor 1 from section 1a at approximately 500° C. through a collector D and is returned to combustion chambers 4.1 and 4.2 by way of a booster 10.

Excess heat vehicle D is extracted from the system in the form of flue gas D' by way of an expander 11. Expander 11 drives a compressor 12 that compresses air C for burning with fuel B.

The reduction-agent system will now be specified. Reduction is accomplished in accordance with the present invention with hydrogen. One advantage is that there is no need for a carbon-dioxide wash in system section E'. Hydrogen A is generated in an unillustrated natural-gas and steam reformer.

Hydrogen A is mixed with circulating gas E' at a node 14, conveyed in the form of an ore-reducing gas A' to a throat-gas recuperator 15, and heated to approximately 500° C. The preliminarily heated ore-reducing gas A' is further heated no higher than 750° C. in the heat exchangers 5.1 and 5.2 downstream of the combustion chambers 4.1 and 4.2 in heat vehicle D. Ore-reducing gas A' then enters the various sections of fluidized-bed reactor 1 by way of oncoming-gas floors 2. The ore-reducing gas than leaves the end of reactor 1 in the form of throat gas E and is conveyed for coarse filtering to flue-gas cyclones 17 and 18. 85 to 90% of the dust F' that occurs is precipitated in first cyclone 17 and another 5 to 8% in second cyclone 18.

The rest of throat gas E is washed in a washer 19 that employs a Venturi principle, and a quencher 20 that quenches with water. Water vapor is condensed out of the mixture of hydrogen and water in quencher 20. The hydrogen remaining in gas E' is compressed to operating pressure in a compressor 16 and forwarded to node 14, where additional hydrogen A can be introduced if necessary.

Material system F and G will now be specified. The incoming fine-particle ore or ore concentrate F is stored in journey hoppers 23. From journey hoppers 23 the ore is forwarded to a flow-control tank 24. From flow-control tank 24 it travels through an airtight vessel 25 and is blown into reactor section 1a from below. The pressure in flow-control tank 24 is kept at the same level as that in airtight vessel 25 by an inert gas M.

The dust F' from throat gas E leaves first cyclone 17, travels through a cooling section 17a, and is as hereintofore specified added to the material system.

Dust F', which represents recycled ore, is advanced for reuse to the flow-control tank 24 in the material system.

It can be assumed that as much as 10% of the entering ore or ore concentrate F, no more than 140 kg per metric ton or iron, that is, will be extracted with throat gas E. 120 to 130 kg of this will be returned to reactor 1. 10 to 20 kg of incompletely reduced ore is collected in a tank 18a a forwarded to a briquetter 31.

Ore or ore concentrate F and recycled dust F' travel through the fluidized beds in the three sections of fluidized-bed reactor 1 and are transferred at the end of the reactor in the form of sponge G into a holding tank 28. From holding tank 28 they are forwarded to briquetter 31.

The entrained throat gas E is forwarded to inert-gas system M from holding tank 28.

Below the outlet for sponge G is a carburization-vehicle intake 30. The vehicle is obtained from a reservoir 32 over a line H.

The auxiliary systems will now be specified.

The flue-gas and inert-gas system will be specified first. The flue gas D' not needed for the product is extracted through expander 11 and employed for other purposes.

Since inert gas M is needed for conveying ore or ore concentrate F, it is separated from flue gas D' upstream of expander 11, cooled in a gas cooler 29, compressed in an inert-gas compressor 27, and forwarded to an inert-gas reservoir 26.

The water system will now be specified. Supplementary water I is constantly supplied to washer 19 and quencher 20. The dust-laden discharge water L is forwarded in the capacity of water K of circulation through filters 21 and to washer 19 by a pump 22.

Water K of circulation is cooled to the requisite operating temperature with cooling water N in a cooler N. If there are too many solids in water K of circulation, it will be removed from circulation in the form of discharge water L.

Figure 3:
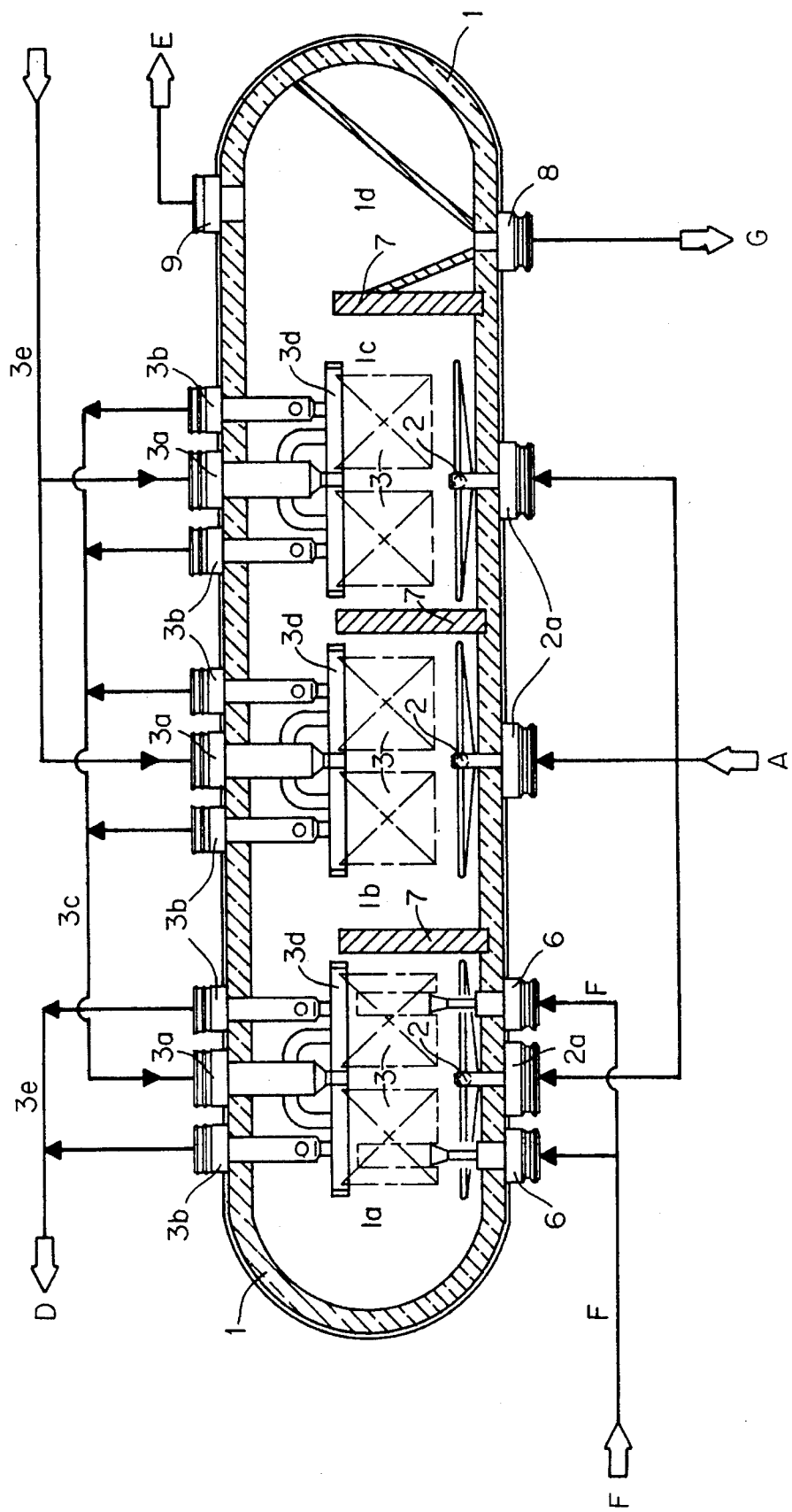
FIG. 3 is a longitudinal section through a reactor divided into three sections.

FIG. 3 is a longitudinal section through the process-determining components of a horizontal reactor 1. The reactor is divided by partitions 7 into ore-processing sections 1a, 1b and 1c and a sponge-collecting section 1d.

The heated and compressed hydrogen A is forwarded to each reactor section 1a, 1b, and 1c by way of oncoming-gas floors 2, producing a fluidized bed that ore is simultaneously added to. Heat vehicle D arrives in the three heat exchangers 3 at three different temperatures through three different intakes 3a, each in a different section 1a, 1b, and 1c.

Heat vehicle D initially travels through heat exchangers 3 into reactor sections 1c and 1b and then through a line 3c to the heat exchanger 3 in reactor section 1a. It leaves through connections 3b and a line 3e.

Ore F is blown into reactor section 1a at operating pressure through connections 6, and the reduced ore is transferred in the form of sponge G to sponge-collecting section 1d through outlets 8. Throat gas E leaves reactor 1 through connections 9.

I claim:

1. Method of directly reducing fine-particle ores and concentrates thereof in a horizontal reactor by means of an ore-reducing gas and a heat-vehicle gas in a fluidized bed, characterized in that the ore or ore concentrate (F) is blown into one section (1a) of the reactor (1), in that it is heated and partly reduced in that section, extensively further reduced in another section (1b) of the reactor, and terminally reduced in a third section (1c), in that oncoming fluid in the form of a compressed ore-reducing gas (A or A') heated to 450° to 800° C. is blown into the reactor from below to create a fluidized bed and reduce the ore, in that a heat vehicle D in the form of gas heated to 500° to 850° C. indirectly adds heat to the bed through heat exchangers (3), in that a circulating gas (E') in the form of filtered and compressed throat gas (E) is mixed with the ore-reducing gas, heated, and returned to the reactor, and in that the dust (F') entrained by the throat gas is precipitated in flue-gas cyclones 17 and 18, mixed with the ore or ore concentrate, and returned to the ore-reducing system.

2. Method as in claim 1, characterized in that reduction is controlled and the fluidized bed maintained by blowing heated and compressed ore-reducing gas (A or A') into each zone (1a, 1b, and 1c) of the reactor through oncoming-gas floors (2) at a different temperature.

3. Method as in claim 1, characterized in that the endothermic reaction is supported by blowing heated heat vehicle (D) into the heat exchangers (3) in the reactor sections (1a, 1b, and 1c) at different temperatures.

4. Method as in claim 3, characterized in that the heat vehicle (D) essentially comprises nitrogen and carbon dioxide, is generated by burning fuel B in the form of gas in combustion chambers (4.1 & 4.2), and is forwarded to the heat exchangers (3).

5. Method as in claim 3, characterized in that compressed air (C) is introduced to support burning the fuel (B) to make the heat vehicle (D).

6. Method as in claim 3, characterized in that the temperature of the heat vehicle (D) can be varied and is between 700° and 800° C. in the first reactor section (1a), between 600° and 700° C. in the second reactor section (1b), and between 550° and 650° C. in the third reactor section (1c).

7. Method as in claim 3, characterized in that the heat vehicle (D) leaves the heat exchanger (3) in the first reactor section (1a) at 400° to 600° C. and is forwarded to the combustion chambers (4.1 & 4.2) through a booster (10).

8. Method as in claim 3, characterized in that excess heat vehicle (D) is extracted from the system as flue gas (D') and forwarded to an expander (11).

9. Method as in claim 3, characterized in that the heat vehicle (D) produced in the first combustion chamber (4.1) is forwarded to the heat exchanger (3) in the third reactor section (1c) and in that the heat vehicle produced in the second combustion chamber (4.2) is forwarded to the heat exchanger (3) in the second reactor section (1b).

10. Method as in claim 9, characterized in that the heat vehicle (D) that flows through the heat exchangers (3) in the first and second reactor zones (1b & 1c) is forwarded to the heat exchanger (3) in the first reactor section (1a).

11. Method as in claim 9, characterized in that either the heat vehicle (D) from the first two heat exchangers (5.1 & 5.2) or the heat vehicle from the third heat exchanger (5.3) is supplied directly to the heat exchanger (3) in the first reactor section (1a).

12. Method as in claim 1, characterized in that the ore-reducing gas (A) is hydrogen ($H_2$) and is mixed a certain point (14) with the hydrogen in the circulating gas (E').

13. Method as in claim 12, characterized in that the mixture (A') of ore-reducing gases is forwarded through a throat-gas recuperator (15) and heated to 450° to 550° C.

14. Method as in claim 12, characterized in that the heated ore-reducing gas (A') is heated in a heat exchanger (5.1 or 5.2) to a terminal temperature of 550° to 800° C.

15. Method as in claim 12, characterized in that the ore-reducing gas (A or A') is compressed to an operating pressure of 10 to 40 bars and forwarded to the reactor (1).

16. Method as in claim 12, characterized in that the ore-reducing gas (A or A') is compressed to an operating pressure of 20 bars and forwarded to the reactor (1).

17. Method as in claim 12, characterized in that the ore-reducing gas (A') heated in the first heat exchanger (5.1) is forwarded to the oncoming-gas floor 2 in the third reactor section (1c) at 500 to 600, in that the ore-reducing gas (A') heated in the second heat exchanger (5.2) is forwarded to the oncoming-gas floor 2 in the second reactor section (1b) at 550 to 700, and in that the ore-reducing gas (A') heated in the third heat exchanger (5.3) is forwarded to the oncoming-gas floor 2 in the first reactor section (1a) at 650 to 800.

18. Method as in claim 12, characterized in that the heated ore-reducing gas (A') is reacted with the oxygen from the ore (F), leaves the reactor (1) in the form of a throat gas (E) through a throat-gas line, and is forwarded to flue-gas cyclones (17 & 18).

19. Method as in claim 1, characterized in that the filtered throat gas (E) is forwarded to a washer (19) that employs a Venturi principle, and a quencher (20) that quenches with water, where the water vapor is condensed out of the mixture of hydrogen and water.

20. Method as in claim 19, characterized in that the filtered and dried circulating gas (E') is compressed to operating pressure and forwarded to the node (14).

21. Method as in claim 18, characterized in that the dust (F') precipitated in the first cyclone (17) is returned to the reduction process from the throat gas (E) and in that the dust (FI) precipitated in the second cyclone (18) is forwarded to a briquetter (31).

22. Method as in claim 18, characterized in that cooled circulation water (K) is forwarded to the washer (19) and quencher (20) along with supplementary water (I).

23. Method as in claim 1, characterized in that the finished ore or ore concentrate (F) is forwarded from journey hoppers (23) to an airtight vessel (24) by conveyors and flow controls and thence at operating pressure into the first section (1a) of the reactor (1) by a blower 25.

24. Method as in claim 23, characterized in that an inert gas (M) obtained from the excess flue gas (D'), cooled in a cooler (29), and compressed to operating pressure in a inert-gas compressor (27) is employed to blow the ore (F) forward.

25. Method as in claim 1, characterized in that a carburizer (H) is added to the sponge (G) after it leaves the sponge-collecting section (1d) of the reactor.

26. Device for carrying out the method recited in claim 1, with a horizontal reactor with interior oncoming-gas floors, with combustion chambers and heat exchangers outside the reactor vessel, and with means of generating the requisite operating pressure, introducing additives into the reactor, removing the flue gas, and extracting product from the reactor and processing the product further, characterized in that the reactor vessel is an in-itself known horizontal fluidized-bed reactor (1) with heat exchangers (3) immersed in it, in that the reactor is divided into three sections (1*a*, 1*b*, & 1*c*) by partitions (7) of limited height, by at least one oncoming-gas floor (2) at the bottom and by at least one heat exchanger (3) at the top of each section, by pipelines 3*c* communicating with the intakes (3*a*) and outlets (3*b*) of the heat exchangers (3) outside the reactor for forwarding a heat vehicle (D) in the form of a gas, by an intake (6) for ore (F) at the first reactor section (1*a*), and by an outlet (8) for sponge (G) and another outlet (9) for throat gas (E) at the third reactor section (1*c*).

27. Device as in claim 26, characterized in that the partitions (7) are secured to the bottom of the reactor (1) and extend up to the intake-collector pipes (3*d*) on the heat exchanger (3).

28. Device as in claim 26, characterized in that the heat exchangers (3) in the reactor sections (1*a*, 1*b*, & 1*c*) are coils of tubing accommodated inside the vessel.

29. Device as in claim 26, characterized in that the oncoming-gas floors (2) are secured to supply lines (2*a*) in the lower wall of the reactor (1).

30. Device as in claim 26, characterized by a heat exchanger (5.1) downstream of one combustion chamber (4.1) and by another heat exchanger (5.2) downstream of the other combustion chamber (4.2).

31. Device as in claim 30, characterized by a third combustion chamber (4.3) and a third heat exchanger (5.3).

32. Device as in claim 30, characterized in that the heat exchangers (3) communicate through an external line (3*c*) that extends between intakes (3*a*) and outlets (3*b*).

33. Device as in claim 30, characterized in that the heat exchanger (3) in the first reactor section (1*a*) communicates with the combustion chambers (4.1 & 4.2) through a pipeline (3*e*) with a booster (1) in it.

34. Device as in claim 26, characterized by flue-gas cyclones (17 & 18), a throat-gas recuperator (15), a washer (19) that employs a Venturi principle, a quencher (20) that quenches with water, and a compressor (16) that compresses the circulating gas (E') accommodated in the system that the throat gas (E) circulates through.

35. Device as in claim 34, characterized by a filters (21), an intermediate cooler (32), and a circulator (22) in the form of a pump downstream of the washer (19) and quencher (20) in the system that the water (K) of circulation circulates through.

36. Device as in claim 26, characterized in that the line that forwards the circulating gas (E') communicates at a node (14) with the line that forwards the reduction gas (A).

37. Device as in claim 26, characterized by an expander (11) for driving the compressor (12) for excess heat vehicle (D) in the form of flue gas (D').

38. Device as in claim 26, characterized by an airtight vessel (24) and a pressurized inert-gas reservoir (26) upstream of the injection vessel (25) and in that the line that the ore (F) is introduced through is at the bottom of the first reactor section (1*a*).

39. Device as in claim 38, characterized in that a line that forwards inert gas (M') branches off upstream of the expander (11) from the line that forwards excess heat vehicle in the form of flue gas (D') and by a gas cooler (29) between the line that forwards the flue gas (D') and the inert-gas compressor (27).

40. Device as in claim 38, characterized by a carburization-vehicle intake (30) downstream of the outlet (8) for the sponge (6), by tanks (28) for storing the sponge, and by, downstream of the first cyclone (17), a cooling section (17*a*) and a line for returning dust (F') to the journey hoppers (23) for recirculation.

* * * * *